US011823443B2

(12) United States Patent
Kuo et al.

(10) Patent No.: US 11,823,443 B2
(45) Date of Patent: Nov. 21, 2023

(54) SEGMENTING OBJECTS BY REFINING SHAPE PRIORS

(71) Applicant: Google LLC, Mountain View, CA (US)

(72) Inventors: Weicheng Kuo, Berkeley, CA (US); Anelia Angelova, Sunnyvale, CA (US); Tsung-Yi Lin, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 423 days.

(21) Appl. No.: 17/290,814

(22) PCT Filed: Aug. 14, 2019

(86) PCT No.: PCT/US2019/046447
§ 371 (c)(1),
(2) Date: May 3, 2021

(87) PCT Pub. No.: WO2020/101777
PCT Pub. Date: May 22, 2020

(65) Prior Publication Data
US 2021/0374453 A1    Dec. 2, 2021

Related U.S. Application Data

(60) Provisional application No. 62/768,481, filed on Nov. 16, 2018.

(51) Int. Cl.
*G06V 10/82* (2022.01)
*G06T 7/10* (2017.01)
(Continued)

(52) U.S. Cl.
CPC ............. *G06V 10/82* (2022.01); *G06T 7/10* (2017.01); *G06V 10/25* (2022.01); *G06V 10/26* (2022.01);
(Continued)

(58) Field of Classification Search
None
See application file for complete search history.

(56) References Cited

U.S. PATENT DOCUMENTS

2018/0108137 A1*  4/2018  Price ...................... G06N 3/08

OTHER PUBLICATIONS

PCT International Preliminary Report on Patentability in International Application No. PCT/US2019/046447, dated May 27, 2021, 11 pages.

(Continued)

*Primary Examiner* — Bernard Krasnic
(74) *Attorney, Agent, or Firm* — Fish & Richardson P.C.

(57) ABSTRACT

Methods, systems, and apparatus, including computer programs encoded on a computer storage medium, for performing instance segmentation by detecting and segmenting individual objects in an image. In one aspect, a method comprises: processing an image to generate data identifying a region of the image that depicts a particular object; obtaining data defining a plurality of example object segmentations; generating a respective weight value for each of the example object segmentations; for each of a plurality of pixels in the region of the image, determining a score characterizing a likelihood that the pixel is included in the particular object depicted in the region of the image using: (i) the example object segmentations, and (ii) the weight values for the example object segmentations; and generating a segmentation of the particular object depicted in the region of the image using the scores for the pixels in the region of the image.

19 Claims, 9 Drawing Sheets

(51) Int. Cl.

| | |
|---|---|
| *G06V 10/26* | (2022.01) |
| *G06V 10/25* | (2022.01) |
| *G06V 20/10* | (2022.01) |
| *G06V 10/764* | (2022.01) |
| *G06V 10/77* | (2022.01) |
| *G06V 10/44* | (2022.01) |
| *G06V 10/774* | (2022.01) |

(52) U.S. Cl.
CPC .......... *G06V 10/454* (2022.01); *G06V 10/764* (2022.01); *G06V 10/774* (2022.01); *G06V 10/7715* (2022.01); *G06V 20/10* (2022.01); *G06T 2207/20081* (2013.01)

(56) References Cited

OTHER PUBLICATIONS

Bai et al., "Deep watershed transform for instance segmentation," Proceedings of the IEEE Conference on Computer Vision and Pattern Recognition, 2017, 9 pages.
Borenstein et al., "Combined top-down/bottom-up segmentation," IEEE Transactions on pattern analysis and machine intelligence, Nov. 2008, 17 pages.
Cai et al., "Cascade r-cnn: Delving into high quality object detection," Proceedings of the IEEE conference on computer vision and pattern recognition, 2018, 9 pages.
Chen et al., "Masklab: Instance segmentation by refining object detection with semantic and direction features," Proceedings of the IEEE Conference on Computer Vision and Pattern Recognition, 2018, 10 pages.
Cordts et al., "The cityscapes dataset for semantic urban scene understanding," Proceedings of the IEEE conference on computer vision and pattern recognition, 2016, 11 pages.
Dai et al., "Instance-sensitive fully convolutional networks," European Conference on Computer Vision, Oct. 2016, 15 pages.
Dai et al., "Instance-aware semantic segmentation via multi-task network cascades," Proceedings of the IEEE conference on computer vision and pattern recognition, 2016, 9 pages.
De Brabandere et al., "Semantic instance segmentation with a discriminative loss function," arXiv preprint arXiv:1708.02551, Aug. 2017, 10 pages.
EP Office Action in European Appln. No. 19766378.4, dated Feb. 18, 2021, 7 pages.
Everingham et al., "The pascal visual object classes (voc) challenge," International journal of computer vision, Jun. 2010, 36 pages.
Gibson et al., "The senses considered as perceptual systems," Boston: Houghton Mifflin, Jan. 1966, 346 pages.
Girshick et al., "Rich feature hierarchies for accurate object detection and semantic segmentation," Proceedings of the IEEE conference on computer vision and pattern recognition 2014, 8 pages.
Girshick et al., "Fast r-cnn," Proceedings of the IEEE international conference on computer vision 2015, 9 pages.
GitHub.com [online], "facebookresearch/Detectron," 2018, retrieved on May 7, 2021, retrieved from URL<https://github.com/facebookresearch/Detectron>, 4 pages.
Hariharan et al., "Simultaneous detection and segmentation," European Conference on Computer Vision, Sep. 2014, 16 pages.
He et al., "Mask r-cnn," Proceedings of the IEEE international conference on computer vision, 2017, 9 pages.
He et al., "Deep residual learning for image recognition," Proceedings of the IEEE conference on computer vision and pattern recognition, 2016, 9 pages.
He et al., "Spatial pyramid pooling in deep convolutional networks for visual recognition," IEEE transactions on pattern analysis and machine intelligence, Jan. 2015, 16 pages.
Hu et al., "Learning to segment every thing," Proceedings of the IEEE Conference on Computer Vision and Pattern Recognition, 2018, 9 pages.
Jiang et al., "Acquisition of localization confidence for accurate object detection," Proceedings of the European Conference on Computer Vision (ECCV), 2018, 16 pages.
Jouppi et al., "In-datacenter performance analysis of a tensor processing unit," Proceedings of the 44th annual international symposium on computer architecture, Jun. 2017, 14 pages.
Khoreva et al., "Simple does it: Weakly supervised instance and semantic segmentation," Proceedings of the IEEE conference on computer vision and pattern recognition, 2017, 21 pages.
Koffka et al., "Principles of Gestalt psychology," Routledge, Oct. 2013, 14 pages.
Kong et al., "Recurrent pixel embedding for instance grouping," Proceedings of the IEEE Conference on Computer Vision and Pattern Recognition, 2018, 11 pages.
Li et al., "Instance embedding transfer to unsupervised video object segmentation," Proceedings of the IEEE conference on computer vision and pattern recognition, 2018, 10 pages.
Li et al., "Fully convolutional instance-aware semantic segmentation," Proceedings of the IEEE conference on computer vision and pattern recognition, 2017, 9 pages.
Lin et al., "Feature pyramid networks for object detection," Proceedings of the IEEE conference on computer vision and pattern recognition, 2017, 9 pages.
Lin et al., "Microsoft coco: Common objects in context," European conference on computer vision, Sep. 2014, 16 pages.
Lin et al., "Focal loss for dense object detection," IEEE transactions on pattern analysis and machine intelligence, 2018, 29 pages.
Liu et al., "Sgn: Sequential grouping networks for instance segmentation," Proceedings of the IEEE International Conference on Computer Vision, 2017, 9 pages.
Liu et al., "Path aggregation network for instance segmentation," Proceedings of the IEEE conference on computer vision and pattern recognition, 2018, 10 pages.
Liu et al., "Affinity derivation and graph merge for instance segmentation," Proceedings of the European Conference on Computer Vision (ECCV), 2018, 18 pages.
Ohn-Bar et al., "Learning to detect vehicles by clustering appearance patterns," IEEE Transactions on Intelligent Transportation Systems, Mar. 2015, 16(5):2511-21.
PCT International Search Report and Written Opinion in International Appln. No. PCT/US2019/046447, dated Nov. 27, 2019, 17 pages.
Pont-Tuset et al., "Multiscale combinatorial grouping for image segmentation and object proposal generation," IEEE transactions on pattern analysis and machine intelligence, Mar. 2016, 14 pages.
Ren et al., "Faster r-cnn: Towards real-time object detection with region proposal networks," arXiv preprint arXiv:1506.01497, Jun. 2015, 14 pages.
Rother et al., "GrabCut interactive foreground extraction using iterated graph cuts," ACM transactions on graphics (TOG), Aug. 2004, 6 pages.
Rutishauser et al., "Is bottom-up attention useful for object recognition?," Proceedings of the 2004 IEEE Computer Society Conference on Computer Vision and Pattern Recognition, Jun. 2004, 8 pages.
Singh et al., "An analysis of scale invariance in object detection snip," Proceedings of the IEEE conference on computer vision and pattern recognition, 2018, 10 pages.
Zhou et al., "Semantic understanding of scenes through the ade20k dataset," International Journal of Computer Vision, Mar. 2019, 19 pages.
EP Office Action in European Appln. No. 19766378.4, dated Jun. 30, 2022, 6 pages.

\* cited by examiner

SEGMENTING OBJECTS BY REFINING SHAPE PRIORS

CROSS-REFERENCE TO RELATED APPLICATION

This application is a National Stage Application under 35 U.S.C. § 371 and claims the benefit of International Application No. PCT/US2019/046447, filed Aug. 14, 2019, which claims priority to U.S. application Ser. No. 62/768,481, filed Nov. 16, 2018, the disclosure of which is incorporated herein by reference.

BACKGROUND

This specification relates to image processing, specifically, instance segmentation.

Instance segmentation refers to processing an image to detect and segment individual objects in the image. Instance segmentation can be performed using machine learning models. Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that performs instance segmentation by detecting and segmenting individual objects in an image.

According to a first aspect there is provided a method performed by one or more data processing apparatus. The method includes processing an image to generate data identifying a region of the image that depicts a particular object. Data defining a set of example object segmentations is obtained from a set of training object segmentations, where each example object segmentation defines an example segmentation of a respective object. A respective weight value is generated for each of the example object segmentations, where the weight value for an example object segmentation characterizes an estimated similarity between: (i) a segmentation of the particular object depicted in the region of the image, and (ii) the example object segmentation. For each of multiple pixels in the region of the image, a score is determined that characterizes a likelihood that the pixel is included in the particular object depicted in the region of the image using: (i) the example object segmentations, and (ii) the weight values for the example object segmentations. A segmentation of the particular object depicted in the region of the image is generated using the scores for the pixels in the region of the image, where the segmentation of the particular object defines, for each pixel in the region of the image, whether the pixel is included in the particular object depicted in the region.

In some implementations, processing the image to generate data identifying a region of the image that depicts a particular object includes processing the image using an object detection neural network.

In some implementations, the data identifying the region of the image that depicts the particular object includes data defining a bounding box around the particular object in the image.

In some implementations, the example object segmentations are cluster centroids obtained by clustering a set of training object segmentations.

In some implementations, each of the example object segmentations defines an example segmentation of a respective object of a same object class.

In some implementations, the method further includes processing the image to generate data identifying an object class of the particular object depicted in the region of the image.

In some implementations, each of the example object segmentations defines an example segmentation of a respective object of the same object class as the particular object depicted in the region of the image.

In some implementations, generating a respective weight value for each of the example object segmentations includes processing, using a prior neural network, an input including: (i) a feature representation of the region of the image, and (ii) the example object segmentations.

In some implementations, the example object segmentations are aligned with the feature representation of the region of the image prior to being processed by the prior neural network.

In some implementations, generating a respective weight value for each of the example object segmentations includes pooling a feature representation of the region of the image and processing an input including the pooled feature representation of the region of the image using a prior neural network.

In some implementations, the input to the prior neural network further includes a feature representation of the portion of the image outside the region depicting the particular object.

In some implementations, the feature representation of the region of the image is obtained from an intermediate output of an object detection neural network used to generate data identifying: (i) the region of the image that depicts the particular object, and (ii) the object class of the particular object.

In some implementations, determining, for each of a set of pixels in the region of the image, a score characterizing a likelihood that the pixel is included in a segmentation of the particular object includes scaling each example object segmentation by the likelihood score for the example object segmentation. The scaled example object segmentations are summed, and the score for a pixel in the region of the image is determined based on a corresponding pixel in an image defined by the sum of the scaled example object segmentations.

In some implementations, generating a segmentation of the particular object depicted in the region of the image using the scores for the pixels in the region of the image includes generating detection features using: (i) a feature representation of the region of the image, and (ii) the scores for the pixels in the region of the image. A coarse segmentation of the particular object depicted in the region of the image is generated using the detection features. An instance embedding of the particular object depicted in the region of the image is generated using: (i) the detection features, and (ii) the coarse segmentation of the particular object. The segmentation of the particular object is generated using the instance embedding of the particular object.

In some implementations, generating detection features includes processing a representation of the scores for the pixels in the region of the image using one or more convolutional neural network layers, and summing the output of the convolutional neural network layers and the feature representation of the region of the image.

In some implementations, generating a coarse segmentation of the particular object includes processing the detection features using one or more convolutional neural network layers.

In some implementations, generating an instance embedding of the particular object depicted in the region of the image using: (i) the detection features, and (ii) the coarse segmentation of the particular object includes generating instance-conditioned features by combining the detection features that are included in the coarse segmentation of the particular object. The instance embedding of the particular object depicted in the region of the image is generated based at least in part on the instance-conditioned features.

In some implementations, generating an instance embedding includes processing the detection features and the coarse segmentation of the particular object using a function $G(\cdot,\cdot)$ defined by:

$$G(X_{det}, M) = X_{det} - \frac{\Sigma(X_{det} \star M)}{|M|}$$

where $X_{det}$ denotes the detection features, M denotes the coarse segmentation, $\star$ denotes elementwise product, and $\Sigma$ denotes summation over spatial dimensions.

In some implementations, generating the segmentation of the particular object includes processing the instance embedding of the particular object using one or more convolutional neural network layers.

According to a second aspect there are provided one or more non-transitory computer storage media storing instructions that when executed by one or more computers cause the one or more computers to perform the operations of the method of the first aspect.

According to a third aspect there is provided a system including one or more computers and one or more storage devices storing instructions that when executed by the one or more computers cause the one or more computers to perform the operations of the method of the first aspect.

Particular embodiments of the subject matter described in this specification can be implemented so as to realize one or more of the following advantages.

The instance segmentation system described in this specification can estimate the shape of an object depicted in an image using a collection of predefined example object segmentations, and then use the estimated shape of the object in segmenting the object. Performing the intermediate step of estimating the shape of the object can enable the instance segmentation system to segment objects more accurately than it otherwise would, e.g., by reducing the likelihood of generating object segmentations with implausible shapes, e.g., broken (disjoint) pieces. This is an improvement in the field of image processing.

The instance segmentation system can segment objects in a class-agnostic manner, i.e., such that the system does not rely on knowing or identifying the class labels (e.g., person, car, boat, etc.) of the objects being segmented during either training or inference. Therefore, the instance segmentation system can segment a given object even without having been trained on object segmentations having the same class label as the given object. Performing the intermediate step of estimating the shape of an object can enable the instance segmentation system to generalize more effectively to segmenting objects from novel classes, e.g., since objects from novel classes may have similar shapes as objects from known classes. An object class is said to be "known" if the instance segmentation system has been trained on object segmentations from the object class, and "novel" otherwise. As a result of effectively generalizing to segmenting objects from novel classes, the system described in this specification is more broadly applicable than some conventional systems. This is another improvement in the field of image processing.

The system described in this specification can generate a segmentation of a given object depicted in an image using an "instance embedding" that characterizes the visual appearance of the object. By using an instance embedding, the system can localize the given object more effectively and thereby generate a segmentation of the given object which excludes other nearby objects (including nearby objects of the same object class as the given object). This is another technical improvement in the field of image processing.

In particular implementations, the architecture of the system described in this specification enables the shape (i.e., dimensionality) of every intermediate output (e.g., tensor) processed by the system to be known at compile time. This can enable the system to be trained using specialized hardware, e.g., artificial intelligence (AI) accelerator hardware, e.g., tensor processing units (TPUs), which can allow the system to be trained 2-3× faster than some conventional systems which cannot be trained using specialized hardware. The parts of the system other than the object detection neural network can be trained using ground-truth detection data (which is potentially jittered), rather than detection data generated by the object detection neural network, which obviates the need for many operations which are not difficult to implement efficiently using specialized hardware (e.g., TPUs). The system can be trained using crops from a pyramid of features which reduces the need for discretizing and resampling and enables the training to be efficiently performed using specialized hardware (e.g., TPUs).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an instance segmentation system that processes an image to detect and segment individual objects in the image. The instance segmentation system can be used in any of a variety of applications, e.g., to facilitate planning and decision making in autonomous driving or robotic manipulation applications. To segment an object depicted in an image, the instance segmentation system first detects the object, e.g., by identifying a bounding box that is predicted to enclose the object in the image. The instance segmentation system estimates the shape of the detected object using a collection of predefined example object segmentations, and then uses the estimated shape of the object in performing the segmentation. These features and other features are described in more detail below. Moreover, in the description below, various dimensionalities are provided for context, but the systems and processes are not limited to these specific examples, and dimensionalities that are different from those described below can also be used.

Figure 1:
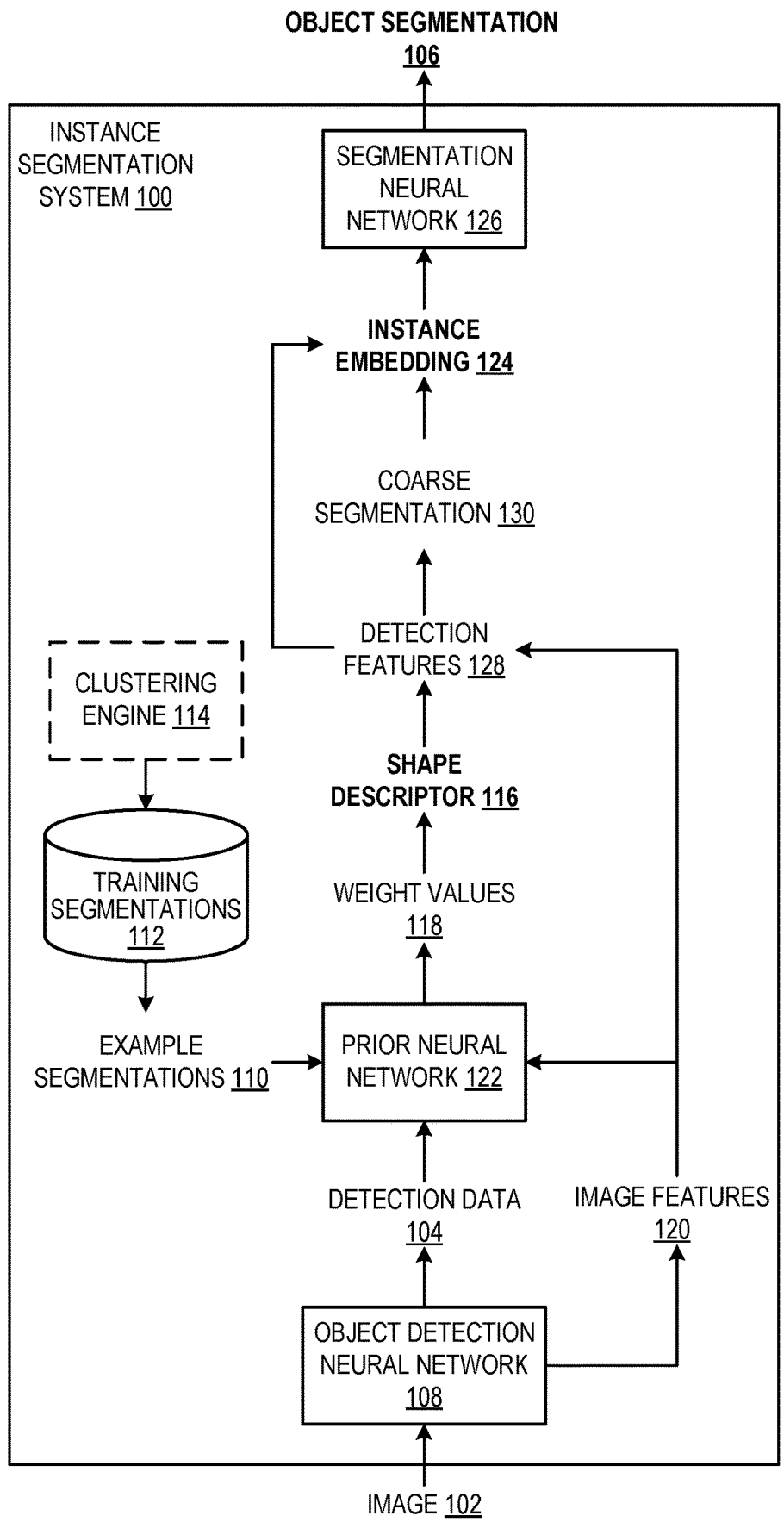
FIG. 1 is a block diagram of an example instance segmentation system.

FIG. 1 is a block diagram of an example instance segmentation system 100. The instance segmentation system 100 is an example of a system implemented as computer programs on one or more computers in one or more locations in which the systems, components, and techniques described below are implemented.

The instance segmentation system 100 is configured to process an image 102 to: (i) detect object depicted in the image, and (ii) generate segmentations of the detected objects. More specifically, the system 100 processes the image 102 to generate detection data 104 which defines regions in the image 102 (e.g., by bounding boxes) which depict respective objects. For each of the image regions defined by the detection data 104, the system 100 generates a respective object segmentation 106 that defines whether each pixel in the region is included in the object depicted in the region.

The image 102 can be represented as a two-dimensional (2D) array of pixels, where each pixel is represented as a vector of one or more values. For example, if the image 102 is a black-and-white image, then each pixel can be represented as an integer or floating point number (i.e., a vector with one component) representing the brightness of the pixel. As another example, if the image 102 is a red-green-blue (RGB) image, then each pixel can be represented as a vector with three integer or floating point components, which respectively represent the intensity of the red, green, and blue color of the pixel.

Figure 2:
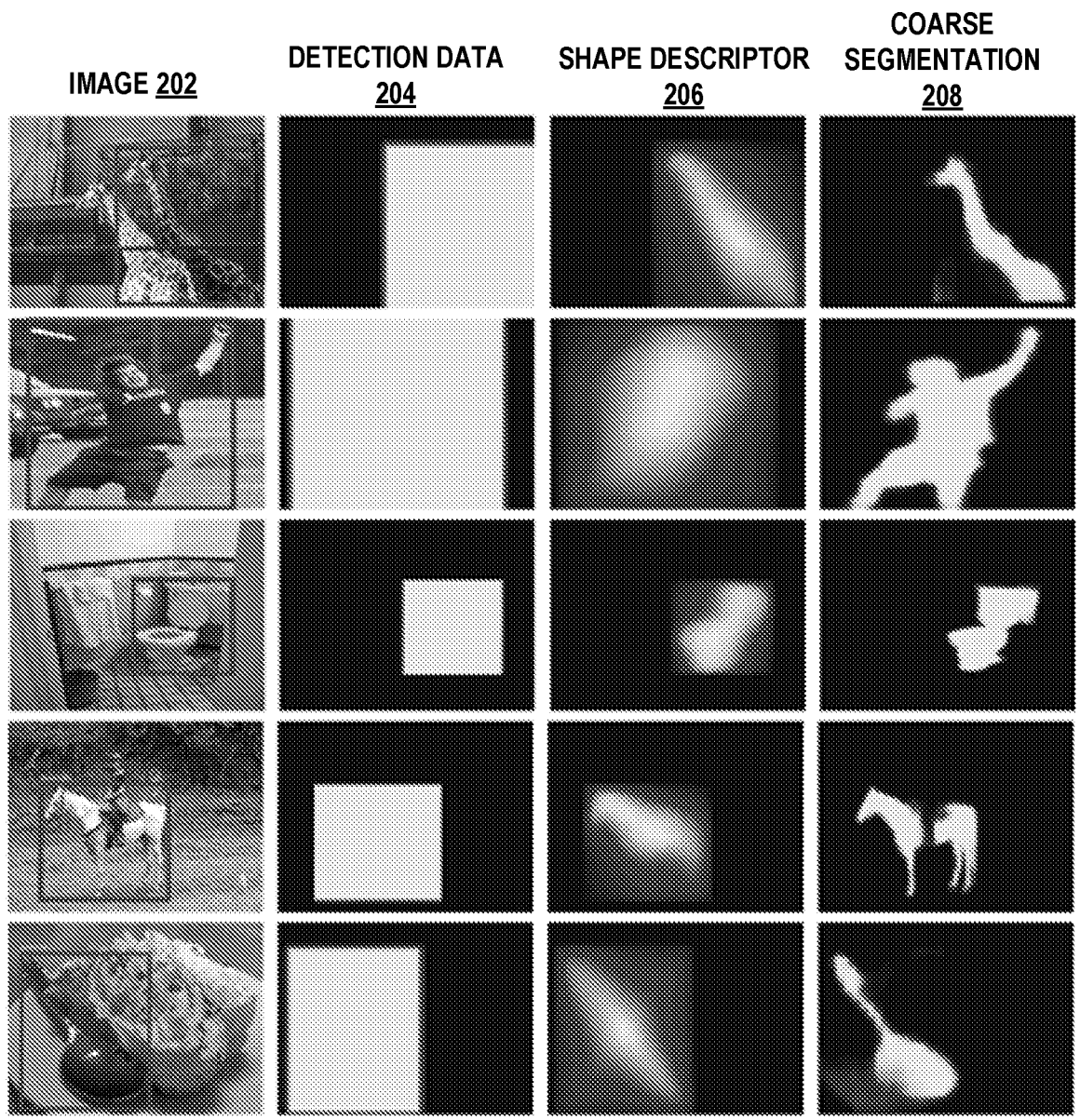
FIG. 2 illustrates examples of images, detection data, shape descriptors, and coarse segmentations.

The system 100 generates the detection data 104 by processing the image 102 using an object detection neural network 108. The detection data 104 defines regions in the image 102 which depict respective objects, and optionally, an object class of the object depicted in each region (e.g., from a predetermined number of object classes). The object classes can include any appropriate object classes, for example, person, vehicle, cat, boat, and the like. FIG. 2 illustrates examples of detection data 104 specifying bounding boxes that enclose objects depicted in images. The object detection neural network 108 can be implemented using any appropriate object detection neural network architecture, e.g., the architecture described with reference to: S. Ren et al., "Faster R-CNN: Towards Real-Time Object Detection with Region Proposal Networks", arXiv:1506.01497v3, 2016.

Generally, the system 100 can generate a respective object segmentation 106 for each object detected in the image 102. For convenience, the discussion which follows will describe generating an object segmentation 106 for a particular detected object.

As an intermediate step in generating the object segmentation 106 for the detected object, the system 100 generates a shape descriptor 116 that characterizes the estimated shape of the object. More specifically, the shape descriptor 116 specifies a respective score for each pixel in the image region enclosing the object that characterizes a likelihood that the pixel is included in the object. The shape descriptor can be represented as a "soft" mask image that estimates the location, scale, and approximate shape of the object, where the value of each pixel of the soft mask image indicates the respective score characterizing the likelihood that the pixel is included in the object. As will be described in more detail below, the system 100 uses the shape descriptor to guide the generation of the object segmentation 106. FIG. 2 illustrates examples of shape descriptors ("detection priors") characterizing the shapes of objects depicted in images.

Generally, the system 100 generates the shape descriptor 116 by combining predefined object segmentations from a set of training segmentations 112. Each training segmentation 112 defines a segmentation of a respective object depicted in a training image and can be represented in any appropriate format. For example, each training segmentation 112 can be represented as a mask image characterizing a segmentation of an object in a training image, where pixels included in the object have one value (e.g., the value 1), and the remaining pixels have a different value (e.g., the value 0).

To generate the shape descriptor 116, the system 100 generates a respective weight value 118 for each of multiple example segmentations 110 from the set of training segmentations 112 (as will be described in more detail later). The weight value 118 for an example segmentation 110 is a numerical value (e.g., a value between 0 and 1) which characterizes an estimated similarity between: (i) the example segmentation 110, and (ii) the object segmentation 106 of the object depicted in the image region. In one example, the system 100 can use the weight values 118 to determine the shape descriptor S as:

$$S = \sum_{k=1}^{K} w_k \cdot S_k \qquad (1)$$

where k indexes the example segmentations 110, K is the total number of example segmentations 110, and $w_k$ is the weight value corresponding to the example segmentation $S_k$. In this example, the mask images representing the example segmentations $\{S_k\}_{k=1}^{K}$ may each have the same dimensionality, e.g., 32×32, or any other appropriate dimensionality.

In some cases, each example segmentation 110 is a respective training segmentation 112, while in other cases, the system 100 generates the example segmentations 110 by clustering the training segmentations 112 using a clustering engine 114. Clustering the training segmentations 112 refers to grouping the training segmentations into a set of clusters, such that training segmentations in the same cluster tend to be more similar than training segmentations in different clusters. The similarity between two training segmentations can be determined in any of a variety of ways, e.g., by a norm (e.g., an $L_2$ norm) of a difference between respective mask images representing the training segmentations. In one example, the system 100 may generate the example segmentations 110 by clustering the set of training segmentations 112 into a predefined number of clusters, and then identifying each cluster centroid as a respective example segmentation 110. The "centroid" of a cluster may be specified by a measure of central tendency (e.g., a mean) of the training segmentations 112 assigned to the cluster.

Figure 3:
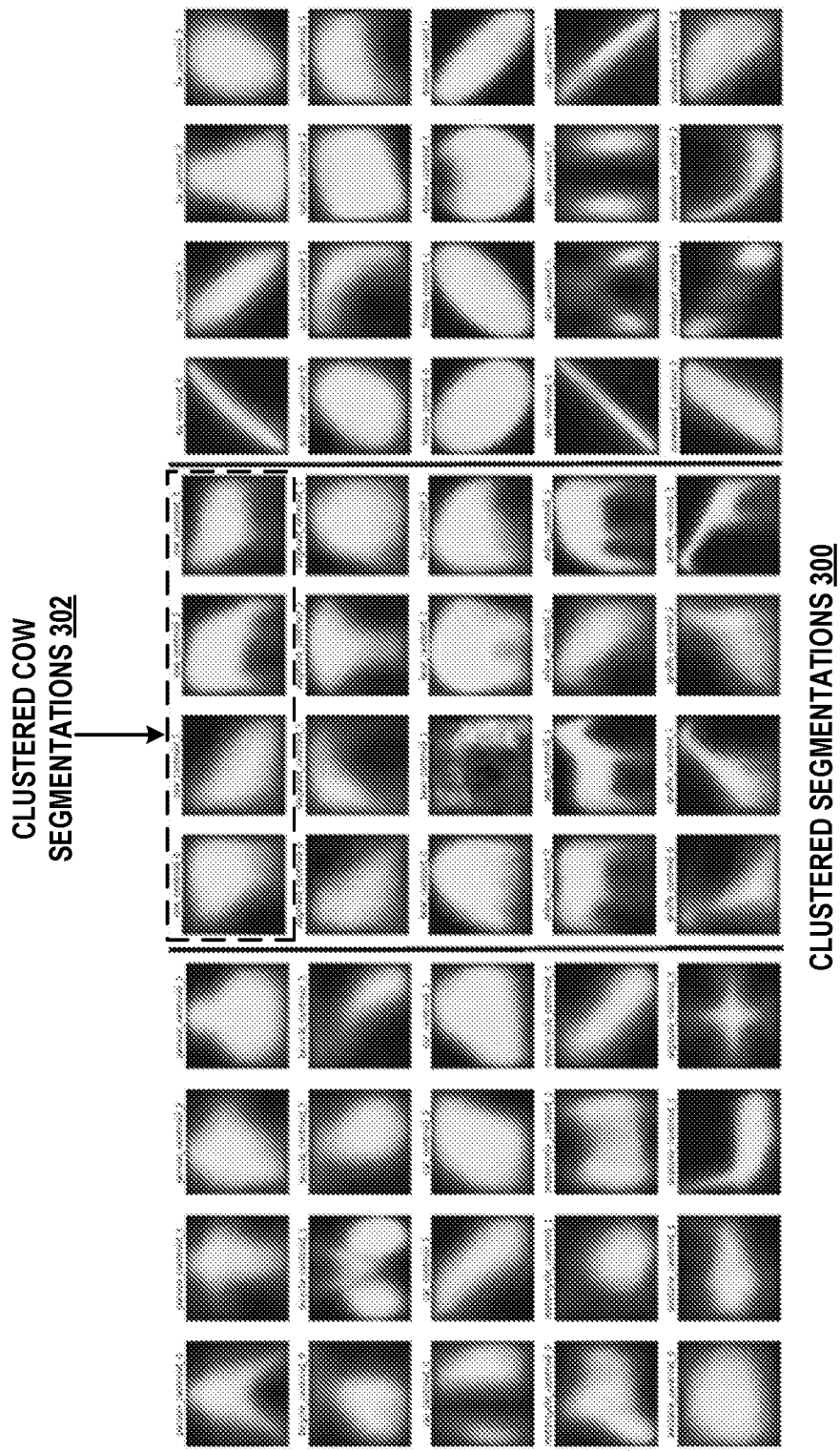
FIG. 3 illustrates example object segmentations that are generated by clustering training segmentations corresponding to certain object classes.

Generating the example segmentations 110 by clustering the training segmentations 112 enables the system 100 to generate a compact representation of the "modes" of the distribution of possible object shapes. The clustering engine 114 can cluster the training segmentations 112 using any appropriate clustering algorithm, e.g., a k-means or expectation-maximization (EM) clustering algorithm. FIG. 3 illustrates examples of cluster centroids obtained by clustering training segmentations.

The system 100 can generate the weight values 118 for the example segmentations 110 by processing a set of image features 120 characterizing the region of the image 102 depicting the object using a prior neural network 122, and optionally, the example segmentations 110. The system 100 can obtain the image features 120 in any of a variety of ways, e.g., by cropping a portion of an intermediate output of the object detection neural network that corresponds to the region of the image depicting the object. An intermediate output of the object detection neural network 108 refers to a feature map generated by an intermediate layer of the object detection neural network, i.e., a layer that follows the input layer but precedes the output layer of the object detection neural network. The image features 120 can be represented as an ordered collection of numerical values, e.g., as a three-dimensional (3D) array of numerical values.

In some cases, the system 100 may generate image features 120 that characterize a larger region of the image 102 than the region specified by the detection data 104 as depicting the object. In one example, if the detection data 104 specifies that the object is enclosed by a bounding box of dimensionality 9×12 in the image 102, the system 100 may generate the image features 120 by cropping a region of an intermediate feature map corresponding to a bounding box of dimensionality 15×15 in the image 102. Thereafter, the system 100 may generate an object segmentation 106 that specifies whether each pixel in the larger region of the image (i.e., that exceeds beyond the borders of the bounding box predicted by the object detection neural network 108) is included in the object. In this manner, the system 100 may generate object segmentations that are robust to inaccuracies in the image regions predicted by the object detection neural network 108 as depicting objects. For example, the system 100 may accurately segment the entirety of an object even if a bounding box generated by the object detection neural network 108 for the object actually excludes a portion of the object, e.g., the arm of a person.

Figure 4:
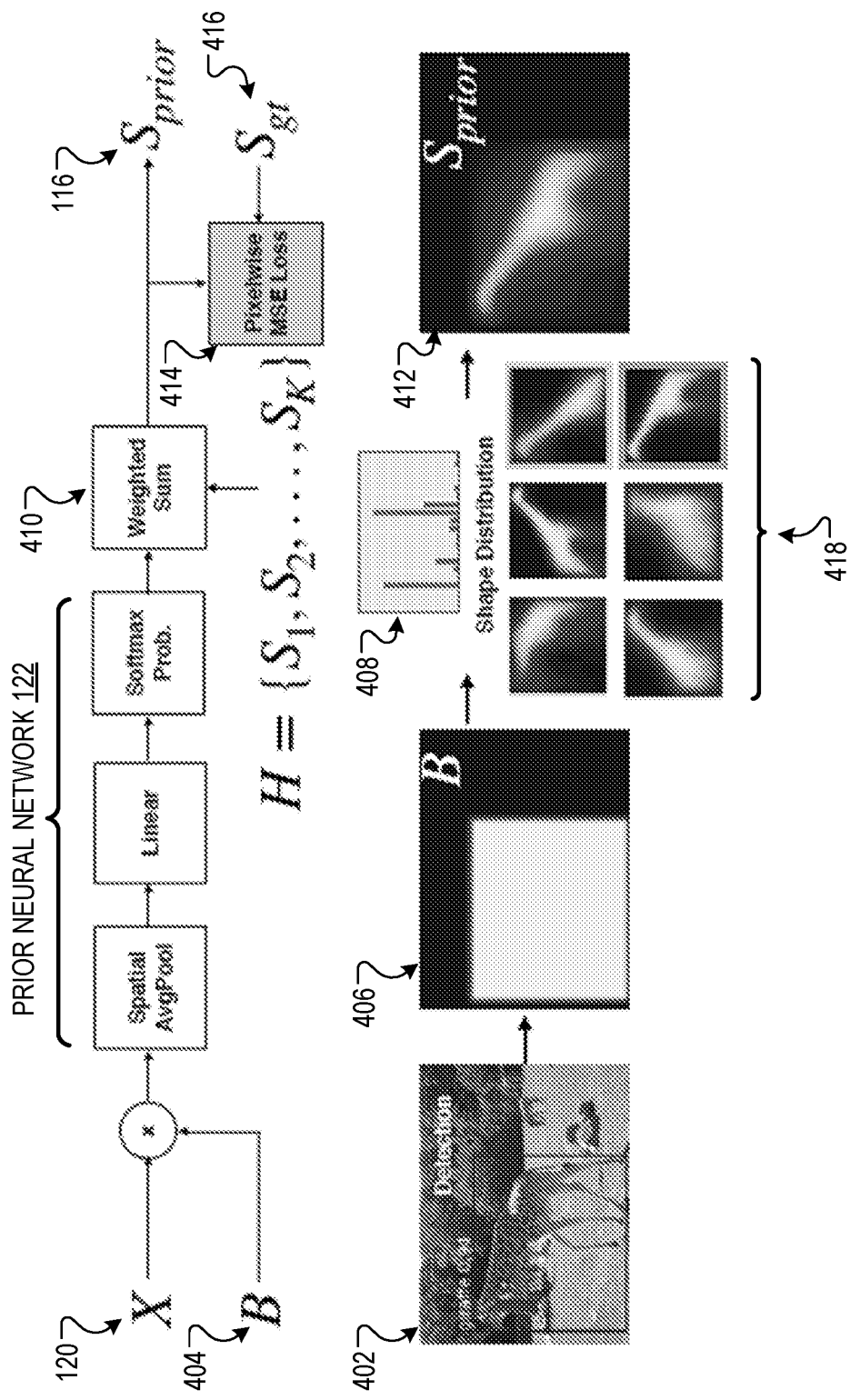
FIG. 4 illustrates example operations that can be performed by the instance segmentation system to generate the shape descriptor for an object being segmented.

The prior neural network may process the image features 120 (and optionally, the example segmentations 110) to generate the weight values 118 in any of a variety of ways. In one example, the prior neural network 122 may generate the weight values 118 by pooling (i.e., combining) the image features 120, and processing the pooled image features to using one or more neural network layers to generate weight values 118 for a predefined set of example segmentations 110. In a particular example, the prior neural network 122 may average pool the image features 120 to generate average pooled image features x as:

$$x = \frac{1}{|B|} \sum_{(i,j) \in B} X_{(i,j)} \quad (2)$$

where B represents the bounding box enclosing the object, $\{(i, j) \in B\}$ represents the set of spatial locations (i, j) enclosed by B, |B| represents the number of spatial locations (i,j) enclosed by B, and $X_{(i,j)}$ represents the image features at (i, j). In this example, the prior neural network 122 may generate the weight values $w=[w_1, w_2, \ldots w_K]$ as:

$$w = \text{softmax}(\phi(x)) \quad (3)$$

where K is the number of example segmentations, $\phi(x)$ represents a K-dimensional output generated by processing the pooled image features x in accordance with the values of the prior neural network parameters, and softmax(•) represents the soft-max normalization function (i.e., that cause the weight values to sum to 1). In another example, the prior neural network 122 may generate the respective weight value 118 for each example segmentation 110 processing the channel-wise concatenation (alignment) of the example segmentation 110 and the image features 120 using the prior neural network 122. FIG. 4 illustrates an example of the operations that can be performed by the prior neural network 122.

Optionally, the object detection neural network 108 may be configured to generate detection data 104 that predicts the classes of the objects depicted in the image 102, and the system 100 may condition the shape descriptor 116 on the predicted class of the object being segmented. For example, the system 100 may generate the shape descriptor 116 by combining only example segmentations 110 corresponding to the same object class as the object being segmented. In a particular example, the system 100 may generate the shape descriptor 116 by combining example segmentations 110 that are generated by clustering training segmentations 112 corresponding to the same object class as the object being segmented. Conditioning the shape descriptor 116 on the predicted class of the object being segmented may enable the system 100 to generate a more informative (accurate) shape descriptor.

The system 100 uses the shape descriptor 116 to guide the segmentation of the object. For example, the system 100 can segment the object by first refining the shape descriptor 116 to generate a "coarse" (approximate) segmentation 130 of the object, and then refining the coarse segmentation 130 to generate the output object segmentation 106, as will be described in more detail next.

To generate the coarse segmentation 130, the system 100 first fuses (combines) the shape descriptor 116 and the image features 120 to generate detection features 128 that jointly characterize: (i) the estimated shape of the object, and (ii) the visual appearance of the image region depicting the object. In one example, the system 100 generates the detection features 128 by embedding the shape descriptor 116 in the same feature dimension as the image features 120 using one or more convolutional layers, and then summing the embedded shape descriptor and the image features 120. More specifically, the system 100 can generate the detection features $X_{prior}$ as:

$$X_{prior} = X + g(S_{prior}) \quad (4)$$

where X represents the image features 120 (e.g., as a three-dimensional (3D) matrix of features), $S_{prior}$ is a representation of the shape descriptor 116, and g(•) represents the operations performed by one or more convolutional neural network layers. The detection features 128 can be represented as an ordered collection of numerical values, e.g., a 3D array of numerical values.

Figure 5:
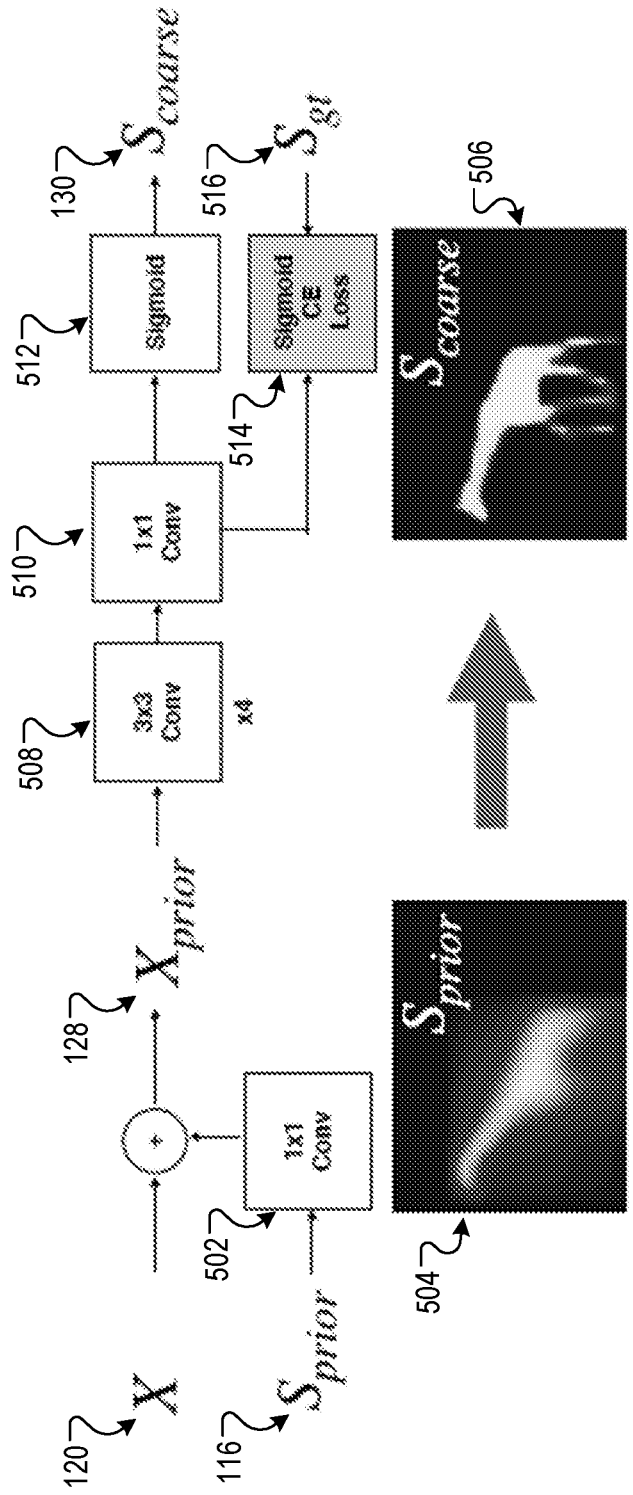
FIG. 5 illustrates example operations that can be performed by the instance segmentation system to generate the coarse segmentation of an object using a shape descriptor.

The system 100 can generate the coarse segmentation 130 of the object based on the detection features 128, e.g., by processing the detection features using one or more convolutional neural network layers. For example, the system 100 can generate the coarse segmentation $S_{coarse}$ as:

$$S_{coarse} = f(X_{prior}) \quad (5)$$

where f (•) represents the operations performed by one or more convolutional layers, and $X_{prior}$ represents the detection features 128. The coarse segmentation 130 can be represented as an ordered collection of numerical values, e.g., a 2D array of numerical values representing a soft mask image that approximates the object segmentation, where each pixel value represents the likelihood that the pixel is included in the object being segmented. While both the shape descriptor 116 and the coarse segmentation 130 can be represented as soft mask images, the coarse segmentation may approximate the actual (ground truth) segmentation of the object more closely than the shape descriptor. In particular, the soft mask image representing the coarse segmentation may be understood as refining the soft mask image representing the shape descriptor. Optionally, the system 100 can binarize the coarse segmentation 130, i.e., by rounding each pixel value to 0 or 1. FIG. 5 illustrates an example of the operations that can be performed to generate the coarse segmentation.

The system 100 can generate the object segmentation 106 by refining the coarse segmentation 130 using an instance embedding 124 that conditions the detection features 128 on the visual appearance of the object being segmented. In one example, to generate the instance embedding 124, the system generates 1D instance-conditioned features $x_{mask}$ by pooling (combining) the detection features 128 included in the coarse segmentation, e.g.:

$$x_{mask} = \frac{1}{|S_{coarse}|} \sum_{(i,j) \in S_{coarse}} X_{prior(i,j)} \quad (6)$$

where $S_{coarse}$ represents the coarse segmentation of the object, $\{(i, j) \in S_{coarse}\}$ represents the set of spatial locations (i, j) in the coarse segmentation $S_{coarse}$, $|S_{coarse}|$ represents the number of spatial locations (i,j) enclosed by $S_{coarse}$, and $X_{prior(i,j)}$ represents the detection features at (i,j). In this example, the system 100 may generate the instance embedding $X_{inst}$ by conditioning the detection features $X_{prior}$ on the instance-conditioned features $x_{mask}$, e.g., as:

$$X_{inst(i,j)} = X_{prior(i,j)} - x_{mask} \quad (7)$$

where $X_{inst(i,j)}$ represents the instance embedding at spatial location (i,j) and $X_{prior(i,j)}$ represents the detection features at spatial location (i,j). The instance embedding 124 can be represented as an ordered collection of numerical values, e.g., a 3D matrix of numerical values.

Figure 6:
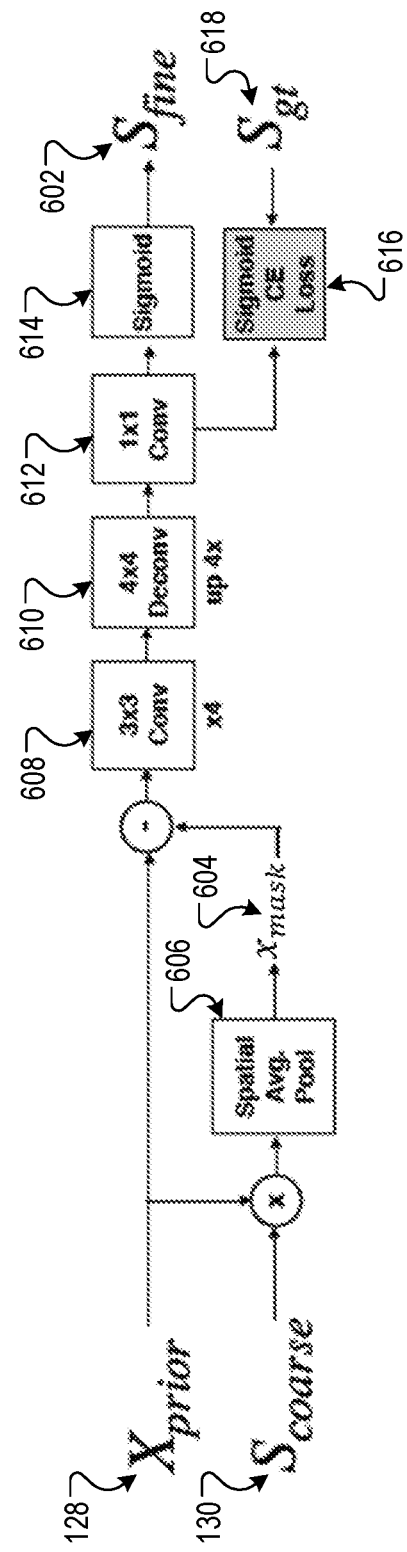
FIG. 6 illustrates example operations that can be performed by the instance segmentation system to refine a coarse segmentation to generate a final segmentation.

The system 100 can generate the object segmentation 106 by processing the instance embedding using a segmentation neural network 126. For example, the system 100 can generate the object segmentation S as:

$$S = h(X_{inst}) \quad (8)$$

where h(•) represents the operations performed by one or more convolutional layers, and $X_{inst}$ represents the instance embedding 124. The object segmentation 106 can be represented as a mask image that defines whether each pixel in a bounding box enclosing the object is included in the object. As described earlier, the object segmentation 106 may extend beyond the bounding box that is predicted by the object detection neural network 108 to enclose the object. FIG. 6 illustrates an example of the operations that can be performed to generate the final segmentation of the object.

FIG. 2 illustrates examples of images 202, detection data 204, shape descriptors 206, and coarse segmentations 208, each of which are described in more detail with reference to FIG. 1. Each of the images 202 depicts one or more objects, e.g., a giraffe, a person, a toilet, a horse, and a spoon. The detection data 204 for each image 202 defines a bounding box that encloses an object depicted in the image. The shape descriptor 206 for each image estimates the shape of the object enclosed by the bounding box. The coarse segmentation 208 for each image is an approximate segmentation of the object enclosed by the bounding box.

FIG. 3 illustrates example object segmentations 300 that are generated by clustering training segmentations corresponding to certain object classes. For example, the four object segmentations 302 represent cluster centroids resulting from clustering training segmentations of cows. It can be appreciated that the clustered segmentations 302 approximately represent "modes" of the distribution of possible shapes of cows. The instance segmentation system can generate a shape descriptor that approximates the shape of an object being segmented by combining multiple clustered training segmentations, as described with reference to FIG. 1.

FIG. 4 illustrates example operations that can be performed by the instance segmentation system to generate the shape descriptor for an object being segmented. To generate the shape descriptor 116 for the giraffe depicted in the image 402, the system can use the prior neural network 122 to spatially average pool the image features 120 enclosed by the bounding box 404 around the giraffe, as described with reference to equation (2). The bounding box 404 is illustrated by 406. The prior neural network 122 can process the average pooled features using a linear layer followed by a soft-max layer to generate a respective weight value for each of multiple example segmentations $\{S_1, \ldots, S_K\}$, as described with reference to equation (3). The example segmentations are illustrated by 418, and the weight values for the example segmentations are illustrated by the shape distribution plot 408. The system generates the shape descriptor 116 as a weighted sum 410 of the example segmentations using the weight values, as described with reference to equation (1). The shape descriptor 116 is illustrated by 412. During training, the system can use a pixel-wise mean squared error (MSE) loss 414 on the shape descriptor 116 against the ground truth segmentation 416 (i.e., from the training data) to learn the parameters of the prior neural network 122.

FIG. 5 illustrates example operations that can be performed by the instance segmentation system to generate the coarse segmentation 130 of the object using the shape descriptor 116. The system may embed the shape descriptor 116 in the same feature dimension as the image features 120 by processing a representation of the shape descriptor 116 using a convolutional layer 502 with 1×1 convolutional filters. The system may generate the representation of the shape descriptor 116 by resizing the shape descriptor to fit into the bounding box enclosing the object, and pasting the resized shape descriptor into an image having: (i) default pixel values, and (ii) the same spatial dimensionality as the image features 120. The image 504 illustrates the representation of the shape descriptor that is processed by the convolutional layer 502. The system generates the detection features 128 by summing the image features 120 and the output of the convolutional layer 502, as described with reference to equation (4). The system then generates the coarse segmentation 130 (illustrated by 506) by processing the detection features 128 using a sequence of 4 convolutional layers 508 with 3×3 convolutional filters, followed by a convolutional layer 510 with 1×1 convolutional filters, followed by a sigmoid layer 512, as described with reference to equation (5). During training, the system can use a pixel-wise cross-entropy loss 514 on the coarse segmentation 130 against the ground truth segmentation 516 (i.e., from the training data) to learn the parameters of the convolutional layers 508, 510, and 512.

FIG. 6 illustrates example operations that can be performed by the instance segmentation system to refine the coarse segmentation 130 to generate the final segmentation 602. The system generates 1D instance-conditioned features $X_{mask}$ 604 by spatially average pooling 606 detection features 128 included in the coarse segmentation 130, e.g., as described with reference to equation (6). The system generates an instance embedding that conditions the detection features 128 on the visual appearance of the object being segmented by subtracting the instance-conditioned features $x_{mask}$ 604 from each spatial location of the detection features 128, e.g., as described with reference to equation (7). The system then generates the output segmentation 602 by processing the instance embedding using a sequence of 4 convolutional layers 608 with 3×3 convolutional filters, a sequence of up to 4 de-convolutional layers 610 with 4×4 convolutional filters, a convolutional layer 612 with 1×1 convolutional filters, and a sigmoid output layer 614, e.g., as described with reference to equation (8). During training, the system can use a pixel-wise cross-entropy loss 616 on the output segmentation 602 against the ground truth segmentation 618 (i.e., from the training data) to learn the parameters of the convolutional layers 608, 610, and 612.

Generally, the instance segmentation system can be jointly trained from end-to-end based on a set of training data using any appropriate machine learning technique, e.g., stochastic gradient descent. Each training example may include: (i) a training image, and (ii) target outputs that should be generated by the instance segmentation system by processing the training image. The target outputs may include, e.g., bounding boxes indicating the regions of the training image that depict objects, and for each bounding box, a pixel-level segmentation of the object enclosed by the bounding box.

Figure 7:
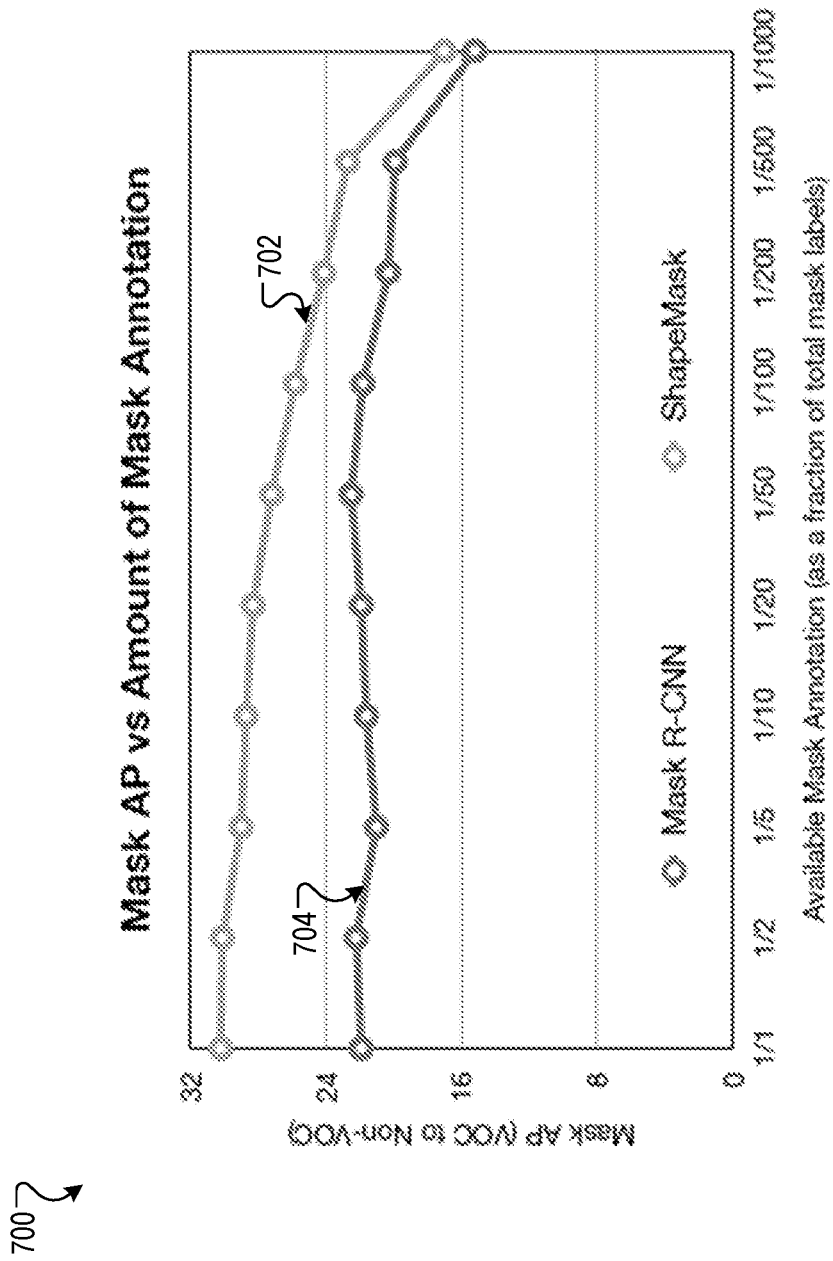
FIG. 7 shows a graph that illustrates an example of the performance gains that can be achieved by using the instance segmentation system.

FIG. 7 shows a graph 700 that illustrates an example of the performance gains that can be achieved by using the instance segmentation system described in this specification. In particular, the line 702 shows the average precision (y-axis) of the instance specification system described in this specification versus the fraction of a set of training set used to train the instance specification system (x-axis). The line 704 shows the average precision of the Mask R-CNN instance segmentation system, e.g., as described with reference to: K. He, G. Gkioxari, P. Dollar, R. Girshick: "Mask R-CNN", the IEEE International Conference on Computer Vision (ICCV), 2017, pp. 2961-2969. It can be appreciated that, in this example, the instance segmentation system described in this specification generally outperforms the Mask R-CNN instance segmentation system. Moreover, in this example, the instance segmentation system described in this specification outperforms the Mask R-CNN instance segmentation system even when the instance segmentation system is trained using only 1% of the training data used to train the Mask R-CNN system.

Figure 8:
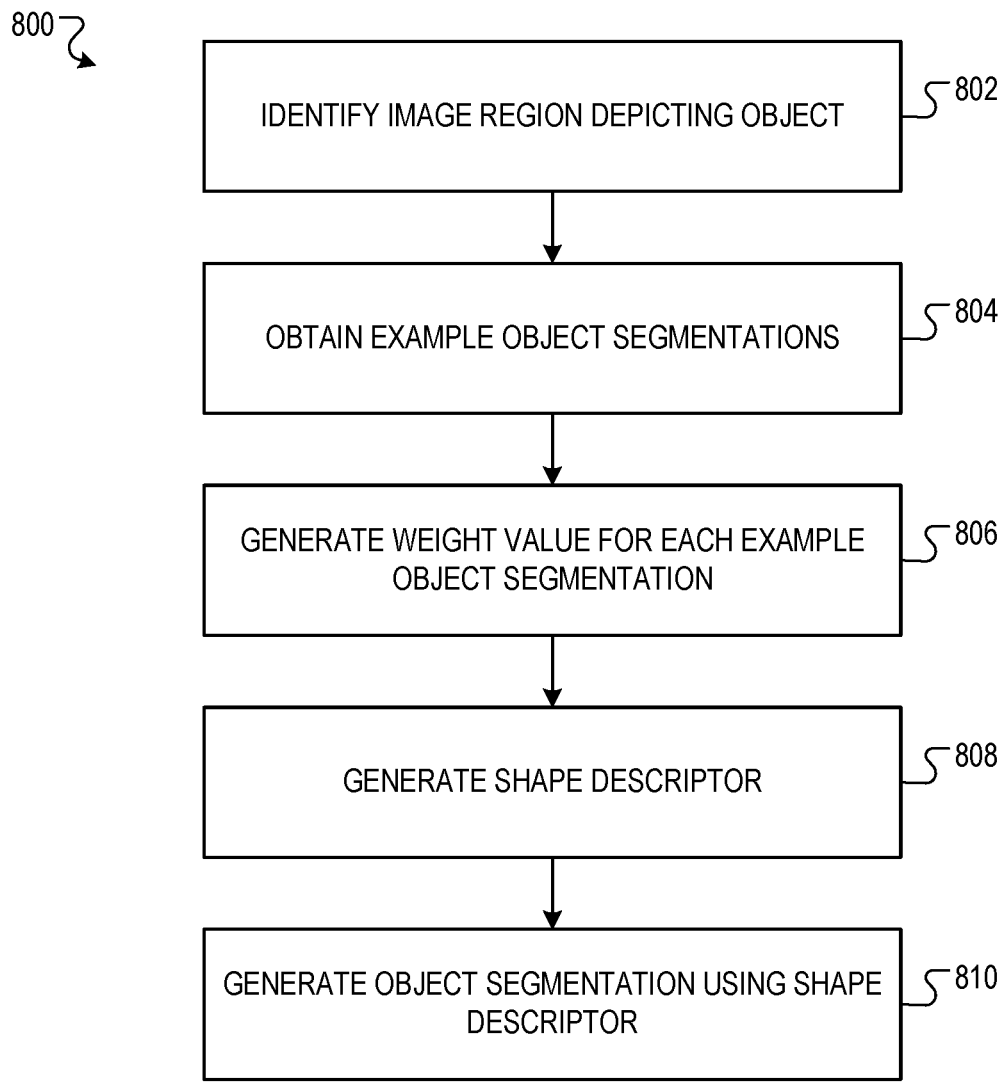
FIG. 8 is a flow diagram of an example process for generating a shape descriptor that estimates the shape of an object.

FIG. 8 is a flow diagram of an example process 800 for generating a shape descriptor that estimates the shape of an object. For convenience, the process 800 will be described as being performed by a system of one or more computers located in one or more locations. For example, an instance segmentation system, e.g., the instance segmentation system 100 of FIG. 1, appropriately programmed in accordance with this specification, can perform the process 800.

The system processes an image to generate data identifying a region of the image that depicts an object (802). For example, the system may process the image using an object detection neural network to generate data defining a bounding box around the object in the image, and optionally, the object class of the object (e.g., person, car, boat, etc.).

The system obtains data defining a set of example object segmentations from a set of training object segmentations, where each example object segmentation defines an example segmentation of a respective object (804). The system may generate the example object segmentations by clustering the training object segmentations, and identifying each cluster centroid as a respective example object segmentation. In some cases, the system obtains example object segmentations that each correspond to the same class as the object being segmented. In one example, the system obtains example object segmentations that are each generated by clustering training object segmentations of objects belonging to the same object class as the object being segmented. In another example, the system obtains example object segmentations that match training object segmentations of objects belonging to the same object class as the object being segmented. Generally, the training object segmentations can be represented by mask images.

The system generates a respective weight value for each of the example object segmentations (806). The weight value for an example object segmentation characterizes an estimated similarity between: (i) the segmentation of the object in the image, and (ii) the example object segmentation. Generally, the system generates the weight values for the example object segmentations by using a prior neural network to process an input that includes a feature representation of the region of the image that depicts the object. The feature representation of the region of the image depicting the object may be obtained, e.g., by cropping a portion of an intermediate output of the object detection neural network that corresponds to the region of the image depicting the object. Optionally, the feature representation may characterize a larger portion of the image than, e.g., the region of the image corresponding to a predicted bounding box around the object that is generated by the object detection neural network.

In one example, the system generates the respective weight value for each example object segmentation by using the prior neural network to process: (i) a feature representation of the region of the image depicting the object, and (ii) the example object segmentation. In this example, the feature representation of the region of the image depicting the object and the example object segmentation may be aligned (e.g., channel-wise concatenated) prior to being processed by the prior neural network. In another example, the system generates the weight values for each of the example object segmentations by using the prior neural network to process a pooled feature representation of the region of the image depicting the object.

The system generates the shape descriptor using: (i) the example object segmentations, and (ii) the weight values for the example object segmentations (808). For pixel in the region of the image depicting the object, the shape descriptor specifies a score characterizing a likelihood that the pixel is included in the object. The system may generate the shape descriptor, e.g., by scaling each example object segmentation by the likelihood score for the example object segmentation, and summing the scaled example object segmentations, e.g., as described with reference to equation (1).

The system generates a segmentation of the object using the shape descriptor (810). The segmentation of the object defines whether each pixel in the region of the image depicting the object is included in the object. An example process for using the shape descriptor to generate the segmentation of the object is described with reference to FIG. 9.

Figure 9:
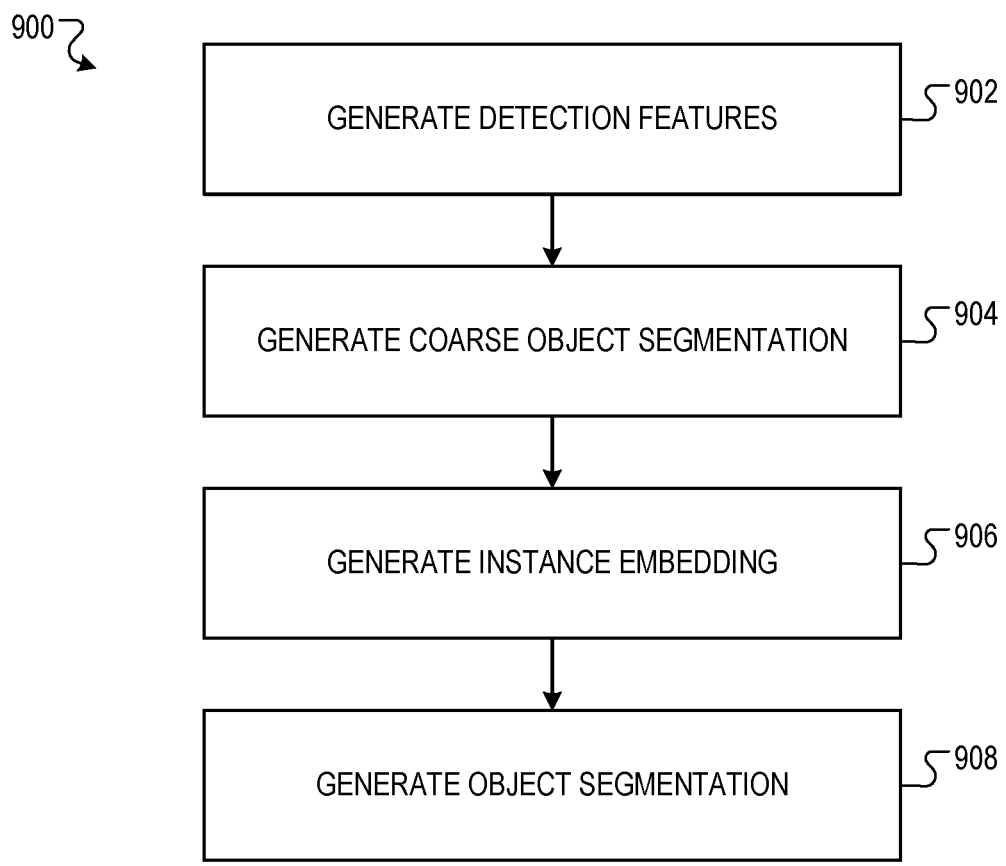
FIG. 9 is a flow diagram of an example process for generating an object segmentation using a shape descriptor.

FIG. 9 is a flow diagram of an example process 900 for generating an object segmentation using a shape descriptor. For convenience, the process 900 will be described as being performed by a system of one or more computers located in one or more locations. For example, an instance segmentation system, e.g., the instance segmentation system 100 of FIG. 1, appropriately programmed in accordance with this specification, can perform the process 900.

The system generates detection features using: (i) a feature representation of the region of the image depicting the object, and (ii) the shape descriptor characterizing the estimated shape of the object (902). An example process for generating the shape descriptor is described in more detail with reference to FIG. 8. In one example, the system may generate the detection features by processing a representation of the shape descriptor using one or more convolutional neural network layers, and then summing: (i) the output of the convolutional layers, and (ii) the feature representation of the region of the image.

The system generates a coarse segmentation of the object using the detection features (904). For example, the system may generate the coarse segmentation of the object by processing the detection features using one or more convolutional neural network layers.

The system generates an instance embedding of the object depicted in the region of the image using: (i) the detection features, and (ii) the coarse segmentation of the object (906). For example, to generate the instance embedding, the system may generate instance-conditioned features by combining (e.g., pooling) the detection features that are included in the coarse segmentation of the particular object, e.g., as described with reference to equation (6). The system may then generate the instance embedding of the object based at least in part on the instance-conditioned features, e.g., as described with reference to equation (7).

The system generates the segmentation of the object using the instance embedding of the object (908). For example, the system may generate the segmentation of the object by processing the instance embedding of the object using one or more convolutional neural network layers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
  processing an image to generate data identifying a region of the image that depicts a particular object;
  obtaining data defining a plurality of example object segmentations from a set of training object segmentations, wherein each example object segmentation defines an example segmentation of a respective object;
  generating a respective weight value for each of the example object segmentations using a prior neural network, wherein the weight value for an example object segmentation characterizes an estimated similarity between: (i) a segmentation of the particular object depicted in the region of the image, and (ii) the example object segmentation;
  for each of a plurality of pixels in the region of the image, determining a score characterizing a likelihood that the pixel is included in the particular object depicted in the region of the image using: (i) the example object segmentations, and (ii) the weight values for the example object segmentations, comprising:
    scaling each example object segmentation by the likelihood score for the example object segmentation;
    summing the scaled example object segmentations; and
    determining the score for a pixel in the region of the image based on a corresponding pixel in an image defined by the sum of the scaled example object segmentations; and
  generating a segmentation of the particular object depicted in the region of the image using the scores for the pixels in the region of the image, wherein the segmentation of the particular object defines, for each pixel in the region of the image, whether the pixel is included in the particular object depicted in the region.

2. The method of claim 1, wherein processing the image to generate data identifying a region of the image that depicts a particular object comprises processing the image using an object detection neural network.

3. The method of claim 1, wherein the data identifying the region of the image that depicts the particular object comprises data defining a bounding box around the particular object in the image.

4. The method of claim 1, wherein the example object segmentations are cluster centroids obtained by clustering a plurality of training object segmentations.

5. The method of claim 1, wherein each of the example object segmentations defines an example segmentation of a respective object of a same object class.

6. The method of claim 1, further comprising processing the image to generate data identifying an object class of the particular object depicted in the region of the image.

7. The method of claim 6, wherein each of the example object segmentations defines an example segmentation of a respective object of the same object class as the particular object depicted in the region of the image.

8. The method of claim 1, wherein generating a respective weight value for each of the example object segmentations comprises processing, using the prior neural network, an input comprising: (i) a feature representation of the region of the image, and (ii) the example object segmentations.

9. The method of claim 8, wherein the example object segmentations are aligned with the feature representation of the region of the image prior to being processed by the prior neural network.

10. The method of claim 8, wherein the input to the prior neural network further comprises a feature representation of the portion of the image outside the region depicting the particular object.

11. The method of claim 8, wherein the feature representation of the region of the image is obtained from an intermediate output of an object detection neural network used to generate data identifying: (i) the region of the image that depicts the particular object, and (ii) the object class of the particular object.

12. The method of claim 1, wherein generating a respective weight value for each of the example object segmentations comprises:
  pooling a feature representation of the region of the image; and
  processing an input comprising the pooled feature representation of the region of the image using the prior neural network.

13. The method of claim 1, wherein generating a segmentation of the particular object depicted in the region of the image using the scores for the pixels in the region of the image comprises:
  generating detection features using: (i) a feature representation of the region of the image, and (ii) the scores for the pixels in the region of the image;
  generating a coarse segmentation of the particular object depicted in the region of the image using the detection features;
  generating an instance embedding of the particular object depicted in the region of the image using: (i) the detection features, and (ii) the coarse segmentation of the particular object; and
  generating the segmentation of the particular object using the instance embedding of the particular object.

14. The method of claim 13, wherein generating detection features comprises:
  processing a representation of the scores for the pixels in the region of the image using one or more convolutional neural network layers; and
  summing the output of the convolutional neural network layers and the feature representation of the region of the image.

15. The method of claim 13, wherein generating a coarse segmentation of the particular object comprises processing the detection features using one or more convolutional neural network layers.

16. The method of claim 13, wherein generating an instance embedding of the particular object depicted in the region of the image using: (i) the detection features, and (ii) the coarse segmentation of the particular object, comprises:
  generating instance-conditioned features by combining the detection features that are included in the coarse segmentation of the particular object; and
  generating the instance embedding of the particular object depicted in the region of the image based at least in part on the instance-conditioned features.

17. The method of claim 16, wherein generating an instance embedding comprises processing the detection features and the coarse segmentation of the particular object using a function $G(.,.)$ defined by:

$$G(X_{det}, M) = X_{det} - \frac{\Sigma(X_{det} \star M)}{|M|}$$

where $X_{det}$ denotes the detection features, M denotes the coarse segmentation, * denotes elementwise product, and Σ denotes summation over spatial dimensions.

18. One or more non-transitory computer storage media storing instructions that when executed by one or more computers cause the one or more computers to perform operations comprising:

processing an image to generate data identifying a region of the image that depicts a particular object;

obtaining data defining a plurality of example object segmentations from a set of training object segmentations, wherein each example object segmentation defines an example segmentation of a respective object;

generating a respective weight value for each of the example object segmentations using a prior neural network, wherein the weight value for an example object segmentation characterizes an estimated similarity between: (i) a segmentation of the particular object depicted in the region of the image, and (ii) the example object segmentation;

for each of a plurality of pixels in the region of the image, determining a score characterizing a likelihood that the pixel is included in the particular object depicted in the region of the image using: (i) the example object segmentations, and (ii) the weight values for the example object segmentations, comprising:
  scaling each example object segmentation by the likelihood score for the example object segmentation;
  summing the scaled example object segmentations; and
  determining the score for a pixel in the region of the image based on a corresponding pixel in an image defined by the sum of the scaled example object segmentations; and generating a segmentation of the particular object depicted in the region of the image using the scores for the pixels in the region of the image, wherein the segmentation of the particular object defines, for each pixel in the region of the image, whether the pixel is included in the particular object depicted in the region.

19. A system comprising one or more computers and one or more storage devices storing instructions that when executed by the one or more computers cause the one or more computers to perform operations comprising:

processing an image to generate data identifying a region of the image that depicts a particular object;

obtaining data defining a plurality of example object segmentations from a set of training object segmentations, wherein each example object segmentation defines an example segmentation of a respective object;

generating a respective weight value for each of the example object segmentations using a prior neural network, wherein the weight value for an example object segmentation characterizes an estimated similarity between: (i) a segmentation of the particular object depicted in the region of the image, and (ii) the example object segmentation;

for each of a plurality of pixels in the region of the image, determining a score characterizing a likelihood that the pixel is included in the particular object depicted in the region of the image using: (i) the example object segmentations, and (ii) the weight values for the example object segmentations, comprising:
  scaling each example object segmentation by the likelihood score for the example object segmentation;
  summing the scaled example object segmentations; and
  determining the score for a pixel in the region of the image based on a corresponding pixel in an image defined by the sum of the scaled example object segmentations; and generating a segmentation of the particular object depicted in the region of the image using the scores for the pixels in the region of the image, wherein the segmentation of the particular object defines, for each pixel in the region of the image, whether the pixel is included in the particular object depicted in the region.

* * * * *